(12) United States Patent
Shyu

(10) Patent No.: US 6,857,392 B1
(45) Date of Patent: Feb. 22, 2005

(54) AQUARIUM PUMPING AND AIRING APPARATUS

(76) Inventor: Shin Fa Shyu, P.O. Box 63-298, Taichung (TW), 406

( * ) Notice: Subject to any disclaimer, the term of this patent is extended or adjusted under 35 U.S.C. 154(b) by 0 days.

(21) Appl. No.: 10/724,290

(22) Filed: Nov. 25, 2003

(51) Int. Cl.⁷ .............................................. A01K 63/04
(52) U.S. Cl. ...................... 119/263; 119/245; 210/254; 210/169; 210/260; 210/261; 210/264; 210/259; 210/416.2; 417/413.1; 417/199.1; 417/201; 417/423.1; 417/423.3; 261/122.1
(58) Field of Search .................................. 119/263, 245; 210/254, 261, 264, 259, 260, 169, 416.2; 261/122.1; 417/413.1, 199.1, 201, 423.1, 423.3

(56) References Cited

U.S. PATENT DOCUMENTS

| | | | |
|---|---|---|---|
| 3,487,440 A | | 12/1969 | Newsteder |
| 4,154,681 A | * | 5/1979 | Shields et al. ............... 210/169 |
| 4,392,953 A | | 7/1983 | Cornelius et al. ........... 210/169 |
| 4,608,000 A | * | 8/1986 | Tominaga ................. 417/413.1 |
| 4,612,876 A | | 9/1986 | Tigert ............................ 119/5 |
| 4,817,561 A | * | 4/1989 | Byrne et al. ................ 119/260 |
| 4,985,181 A | * | 1/1991 | Strada et al. .................. 261/87 |
| 5,062,951 A | | 11/1991 | Tominaga .................... 210/169 |
| 5,188,516 A | * | 2/1993 | Huang ...................... 417/199.1 |
| 5,290,157 A | * | 3/1994 | Willinger et al. ....... 417/423.15 |
| 5,318,701 A | * | 6/1994 | Wang .......................... 210/169 |
| 5,750,023 A | * | 5/1998 | Pettenon ..................... 210/169 |
| 5,938,981 A | * | 8/1999 | Burgess ..................... 261/34.1 |
| 6,164,932 A | * | 12/2000 | Tominaga et al. ........ 417/413.1 |
| 6,523,498 B1 | * | 2/2003 | Shyu ........................... 119/259 |
| 6,551,078 B2 | * | 4/2003 | Huang ......................... 417/420 |
| 2003/0031571 A1 | * | 2/2003 | Yamakawa .................. 417/412 |

FOREIGN PATENT DOCUMENTS

JP          05276850 A  * 10/1993     .......... A01K/63/04

* cited by examiner

Primary Examiner—Peter M. Poon
Assistant Examiner—Andrea M. Valenti

(57) ABSTRACT

An aquarium includes a pump disposed in a chamber of a container to circulate water and having a spindle. An air supplying device is coupled to the spindle of the pump and driven by the spindle of the pump, to pump air into the water contained in the chamber of the container. The pump may thus be used to pump or circulate the water in the aquarium, and to simultaneously supply air into the water contained in the aquarium. The air supplying device includes a valve housing having two check valve members disposed in a recess and a depression, and a membrane attached to the valve housing and forced by the pump to actuate the check valve members.

12 Claims, 6 Drawing Sheets

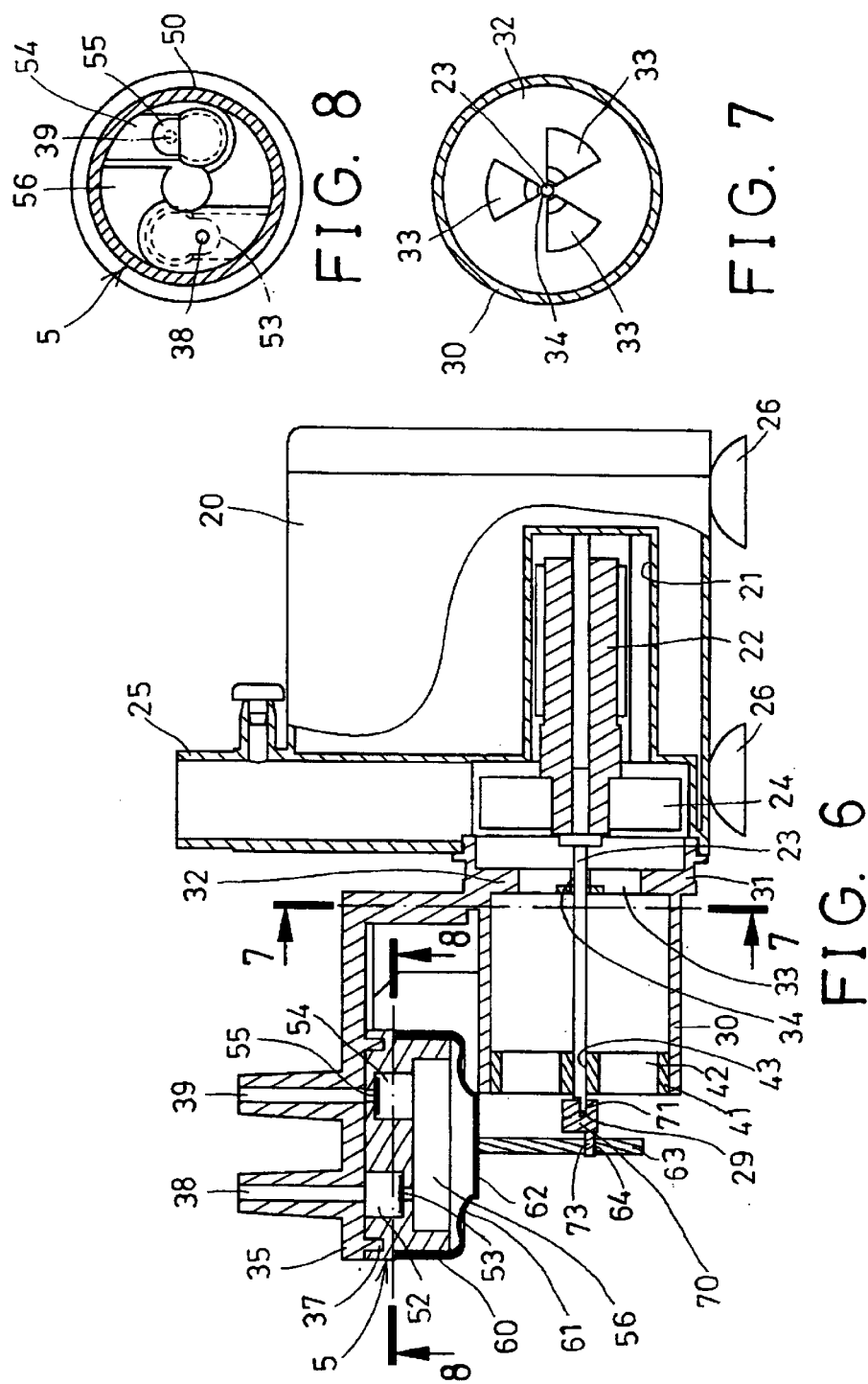

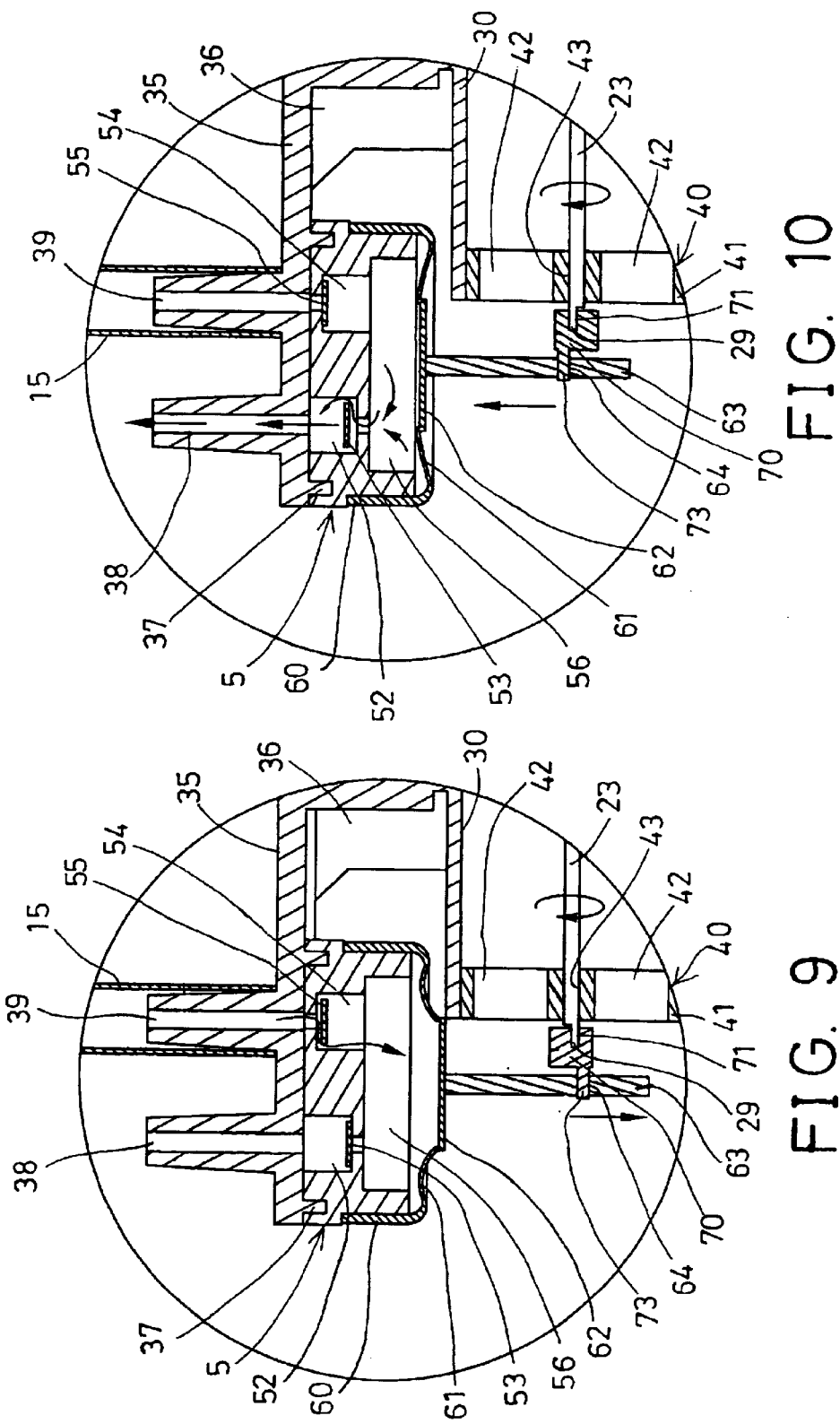

AQUARIUM PUMPING AND AIRING APPARATUS

BACKGROUND OF THE INVENTION

1. Field of the Invention

The present invention relates to an aquarium, and more particularly to an aquarium having an apparatus for water pumping purposes, and for supplying air into the water contained in the aquarium.

2. Description of the Prior Art

Various kinds of typical aquariums have been developed and comprise a container for receiving water and fish therein, and normally comprise a pump disposed in the aquarium for pumping the water through a filtering device, and for allowing the water to be filtered and cleaned.

For example, U.S. Pat. No. 4,392,953 to Cornelius et al. and U.S. Pat. No. 5,062,951 to Tominaga disclose two of the typical aquariums comprising a pump disposed in the aquarium for pumping the water through a filtering device. However, the pump may not be used to supply air into the water or may not bubble the water.

U.S. Pat. No. 3,487,440 to Newsteder discloses a further typical aquarium comprising a hose for receiving pumped air and for supplying the pumped air into the water. However, the pumped air may not be used to pump water or for water filtering purposes.

U.S. Pat. No. 4,612,876 to Tigert discloses a still further typical aquarium comprising an air pump disposed in the aquarium, for air pumping purposes and for supplying the pumped air into the water. However, the air pump also may not be used to pump water or for water filtering purposes.

The present invention has arisen to mitigate and/or obviate the afore-described disadvantages of the conventional aquariums.

SUMMARY OF THE INVENTION

The primary objective of the present invention is to provide an aquarium including an apparatus for water pumping purposes, and for supplying air into the water contained in the aquarium.

In accordance with one aspect of the invention, there is provided an aquarium comprising a container including a chamber provided therein for receiving water therein, a pump disposed in the chamber of the container to circulate the water, the pump including a spindle, and an air supplying device coupled to the spindle of the pump and driven by the spindle of the pump, to pump air into the water contained in the chamber of the container. The pump may thus be used to pump or circulate the water in the aquarium, and to simultaneously supply air into the water contained in the aquarium.

The air supplying device includes a valve housing having a recess and a depression formed therein, and having a chamber formed therein and communicating with the recess and the depression thereof respectively, a first and a second check valve members disposed in the recess and the depression of the valve housing respectively, a membrane attached to the valve housing to enclose the chamber of the valve housing, and means for coupling the spindle of the pump to the membrane, to move the membrane relative to the valve housing.

The air supplying device includes a plate attached to the pump, to support the valve housing, and the plate includes an outlet and an inlet communicating with the recess and the depression of the valve housing respectively. The plate includes a peripheral rib extended therefrom, and valve housing includes a peripheral groove formed therein, to receive the peripheral rib of the plate.

The air supplying device includes a casing attached to the valve housing, to support the membrane. The casing includes a shank extended from the membrane, and a block attached to the spindle of the pump, and coupled to the shank, to move the shank relative to the valve housing.

The block includes an eccentric pin extended therefrom and engaged through the shank of the casing, to move the shank to actuate the membrane in a reciprocating action. The block includes a cavity formed therein and having a non-circular cross section, the spindle of the pump includes a non-circular end to engage and to mate into the cavity of the block, and to prevent the block from rotating relative to the spindle of the pump. The shank includes a disc secured thereto and secured to the membrane for actuating the membrane relative to the valve housing.

The pump includes a port provided therein, and a conduit attached to the port, the conduit includes a partition provided therein and having a bore formed therein, to rotatably receive the spindle of the pump.

The conduit includes a cap attached thereto, and includes a board having a bore formed therein, to rotatably receive the spindle of the pump. The cap includes at least one passage formed therein, to allow the water to flow into the conduit. The partition of the conduit includes at least one passage formed therein, to allow the water to flow from the conduit into the port of the pump.

The air supplying device includes a plate attached to the pump, the plate includes at least one stay extended therefrom and attached to the conduit.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 6 is a partial cross sectional view taken along lines 6—6 of FIG. 2;

FIGS. 7, 8 are cross sectional views taken along lines 7—7 and 8—8 of FIG. 6 respectively; and FIGS. 9, 10 are enlarged partial cross sectional views illustrating the operation of the aquarium.

DETAILED DESCRIPTION OF THE PREFERRED EMBODIMENT

Figure 1:
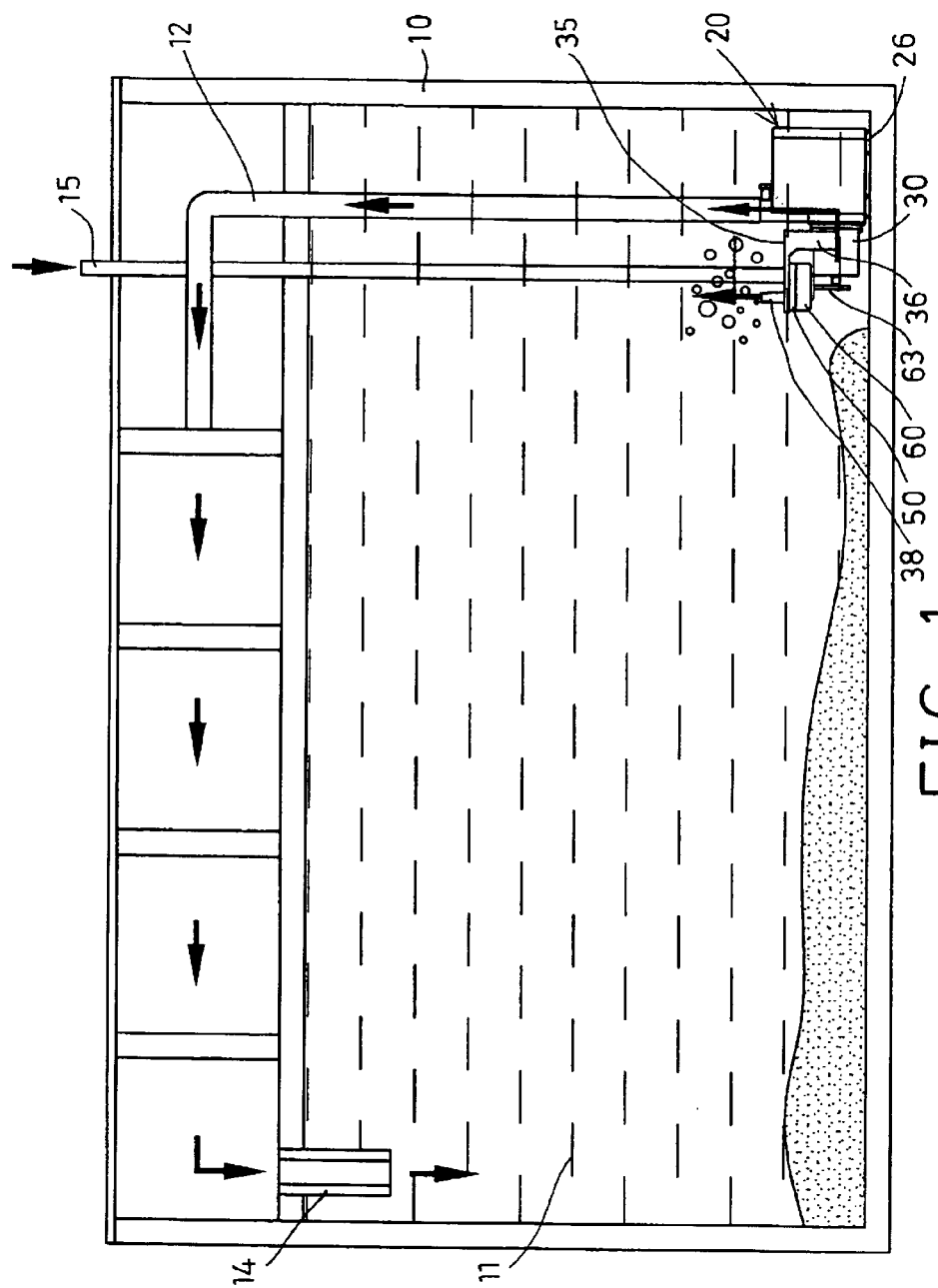
FIG. 1 is a plan schematic view of an aquarium in accordance with the present invention.

Referring to the drawings, and initially to FIG. 1, an aquarium in accordance with the present invention comprises a container 10 including a chamber 11 formed therein for receiving water and fish (not shown), and a pump 20 disposed in the chamber 11 of the container 10, and coupled to a hose 12, for pumping and supplying water through a filtering device 14, and for water filtering purposes.

Figure 2:
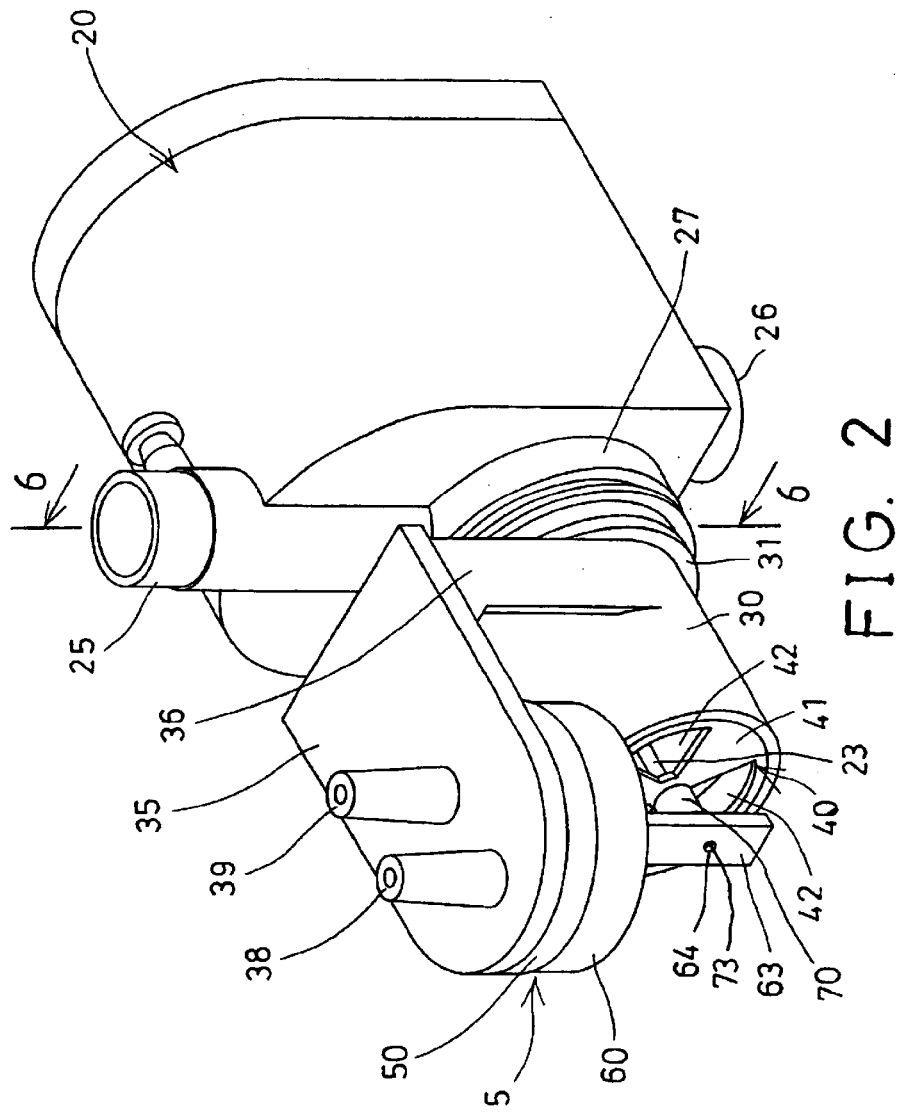
FIG. 2 is a perspective view of a water pumping and air supplying apparatus for the aquarium.
Figure 3:
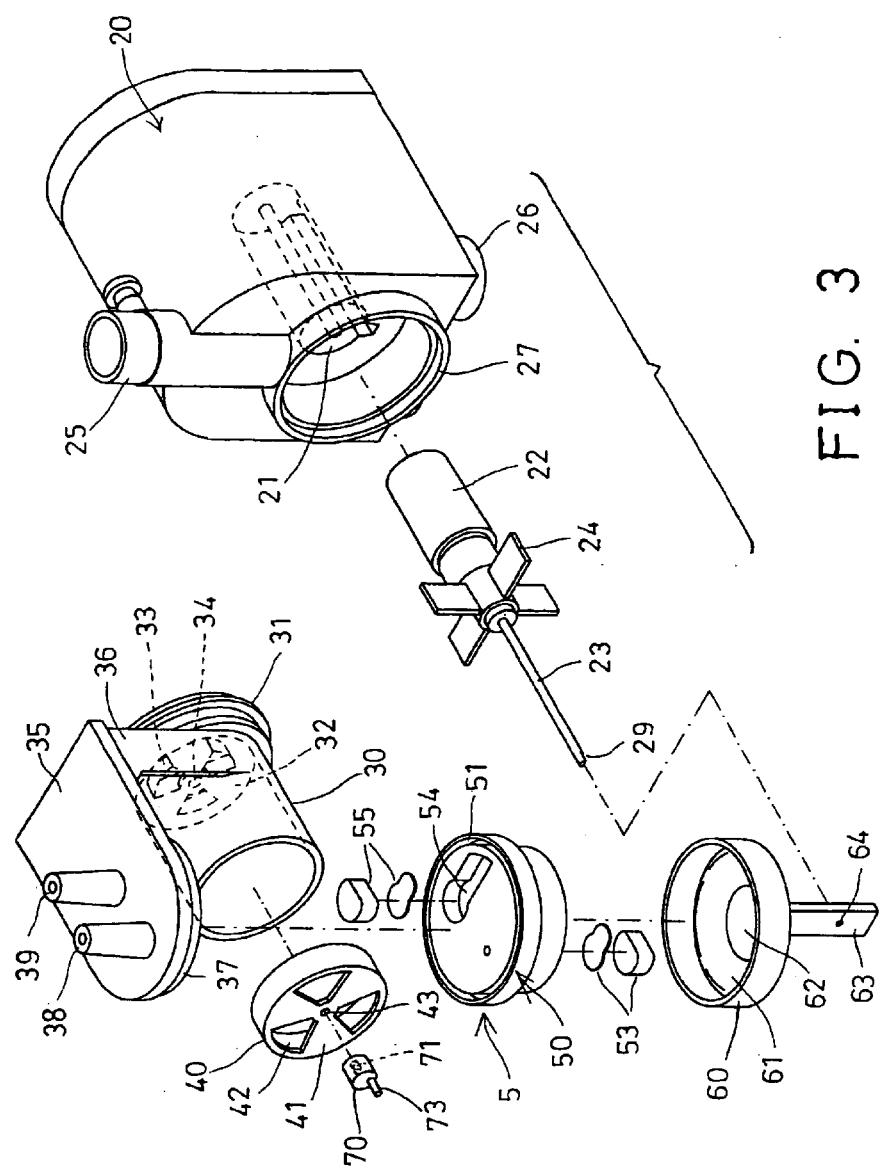
FIG. 3 is a partial exploded view of the water pumping and air supplying apparatus for the aquarium.
Figure 5:
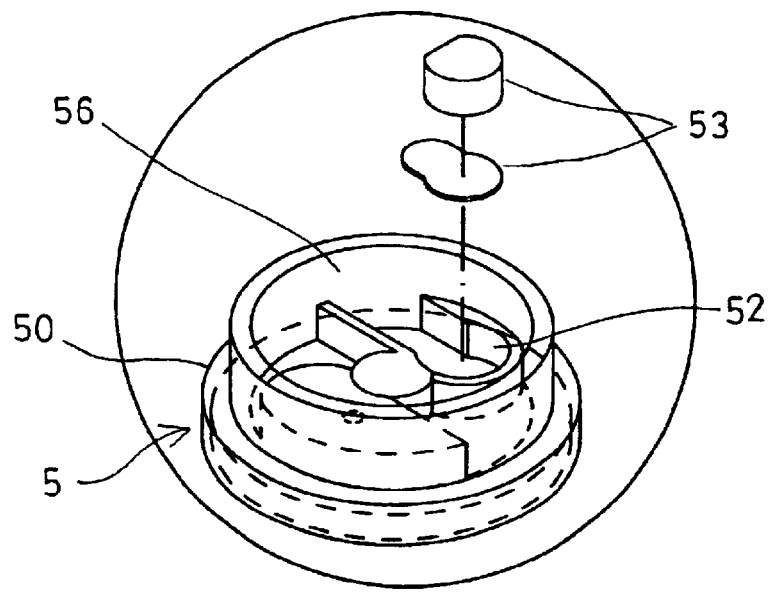
FIG. 5 is an enlarged partial exploded view of a valve device for the water pumping and air supplying apparatus.

For example, as shown in FIGS. 2, 3 and 6, the pump 20 includes a space 21 formed and provided therein for rotatably receiving a rotor 22 therein, for example, a spindle 23 extended from the rotor 22, and a fan or paddle device 24 attached to the rotor 22 or the spindle 23, for being driven to pump the water through the hose 12.

For example, the pump 20 includes an exit 25 coupled to the hose 12 (FIG. 1), and communicating with the space 21 thereof, for allowing the paddle device 24 to pump the water through the exit 25, and then into the hose 12, and toward the filtering device 14. The pump 20 may include one or more pads or sucker members 26 attached to the bottom, for securing to the bottom of the container 10.

Figure 4:
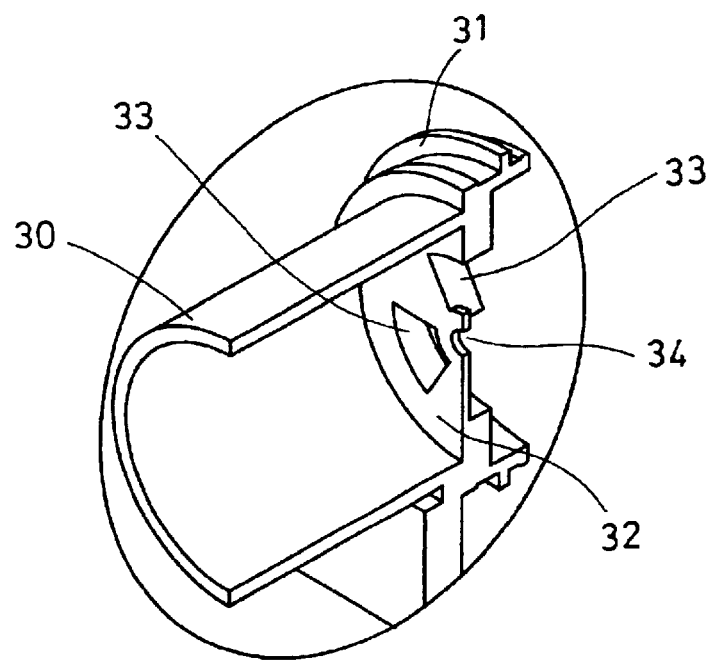
FIG. 4 is an enlarged partial perspective view of a conduit of the water pumping and air supplying apparatus, in which a portion of the conduit is cut-off to show an inner structure of the conduit.

The pump 20 further includes a port 27 formed on one side thereof and communicating with the space 21 and the exit 25 thereof. A conduit 30 includes one end 31 attached to the port 27 of the pump 20, and includes a partition 32 provided therein (FIGS. 4, 6, 7), such as provided in the rear portion thereof, and having one or more passages 33 and a bore 34 formed therein, for allowing the water to be pumped or drawn into the port 27 by the paddle device 24.

A plate 35 includes one or more stays 36 extended therefrom and attached to the conduit 30, and includes a peripheral rib 37 extended downwardly therefrom, and includes an outlet 38 and an inlet 39 formed therein. The plate 35 may also be directly attached to the pump 20. A pipe 15 is coupled to the inlet 39 of the plate 35, and preferably extended out of the container 10, for allowing air to flow into the inlet 39 of the plate 35.

A cap 40 is attached to the conduit 30, such as attached to the front portion the conduit 30, by such as adhesive materials, by welding processes, or the like, and includes a board 41 having one or more passages 42 and a bore 43 formed therein, for allowing the water to be pumped or drawn into the conduit 30. The spindle 23 may be rotatably received in the bores 34, 42 of the partition 32 and the cap 40.

An air supplying device 5 includes a valve housing 50 attached to the plate 35. For example, the valve housing 50 includes a peripheral groove 51 formed in the upper portion thereof (FIG. 3), to receive the peripheral rib 37 of the plate 35, and secured to the plate 35 by such as adhesive materials, by welding processes, or the like.

The valve housing 50 includes a recess 52 formed therein (FIGS. 5, 6, 9, 10) and communicating with the outlet 38 of the plate 35, for slidably receiving a check valve member 53, which is arranged to allow air to flow out through the outlet 38 of the plate 35, and to prevent water from flowing from the chamber 11 of the container 10 into the outlet 38 of the plate 35.

The valve housing 50 further includes a depression 54 formed therein (FIGS. 6, 8, 9, 10) and communicating with the inlet 39 of the plate 35, for slidably receiving another check valve member 55, which is arranged to allow air to flow into the valve housing 50 via the inlet 39 of the plate 35, and to prevent air from flowing from the valve housing 50 out through the inlet 39 of the plate 35 and through the pipe 15. The valve housing 50 includes a chamber 56 formed therein and communicating with the recess 52 and the depression 54 thereof.

A casing 60 is attached to the bottom of the valve housing 50, a membrane 61 is attached to the bottom of the casing 60, a disc 62 is secured to the center portion of the membrane 61, and a shank 63 is extended from or secured to the disc 62 for moving or actuating or operating or pumping the membrane 61, in order to actuate the check valve members 53, 55.

A block 70 includes a cavity 71 formed therein and having a non-circular cross section, for receiving and mating one end 29 of the spindle 23 of the pump 20 that includes a non-circular cross section, for allowing the block 70 to be rotated or driven by the spindle 23, and for preventing the block 70 from being rotated relative to the spindle 23. The block 70 may be secured to the spindle 23 by such as adhesive materials, by welding processes, or the like.

The block 70 includes an eccentric pin 73 extended therefrom and engaged through an orifice 64 of the shank 63 of the casing 60, in order to move the shank 63 to actuate or to move the membrane 61 in a reciprocating action, and so as to actuate the check valve members 53, 55.

In operation, as shown in FIGS. 9 and 10, when the shank 63 is moved up and down in the reciprocating action by the spindle 23, via the eccentric pin 73 of the block 70, the membrane 61 of the casing 60 may be caused to move up and down relative to the valve housing 50 of the air supplying device 5.

For example, when the shank 63 is moved down by the spindle 23 and the eccentric pin 73 of the block 70 (FIG. 9), the membrane 61 of the casing 60 may be caused to move down relative to the valve housing 50 of the air supplying device 5, and thus to expand the chamber 56 of the valve housing 50.

At this moment, the check valve member 53 may be forced to block the recess 52 of the valve housing 50, to prevent air or water from flowing through the outlet 38 of the plate 35 and into the chamber 56 of the valve housing 50. The other check valve member 55 may open the depression 54 of the valve housing 50, to allow the air to flow through the inlet 39 of the plate 35 and into the chamber 56 of the valve housing 50.

On the contrary, when the shank 63 is moved up by the spindle 23 and the eccentric pin 73 of the block 70 (FIG. 10), the membrane 61 of the casing 60 may be caused to move up relative to the valve housing 50 of the air supplying device 5, and thus to reduce the volume of the chamber 56 of the valve housing 50.

At this moment, the check valve member 53 may be forced to open the recess 52 of the valve housing 50, and to allow air to flow out through the outlet 38 of the plate 35 and into the chamber 11 of the container 10. The other check valve member 55 may be forced to block the depression 54 of the valve housing 50, and thus to prevent the air from flowing out of the chamber 56 of the valve housing 50, through the inlet 39 of the plate 35, and to prevent the air from flowing backward into the pipe 15.

The pump 20 may thus be used to pump the water out through the exit 25 and into the filtering device 14 or to circulate the water, and may be used to simultaneously force the membrane 61 of the casing 60 to pump the air into the chamber 56 of the valve housing 50, and then out through the outlet 38 of the plate 35 and into the chamber 11 of the container 10, in reciprocating actions.

Accordingly, the aquarium in accordance with the present invention includes an apparatus for water pumping purposes, and for supplying air into the water contained in the aquarium.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An aquarium comprising:

a container including a chamber provided therein for receiving water therein, a pump disposed in said chamber of said container to circulate the water, said pump including a spindle, and including a port provided therein, and a conduit attached to said port, said conduit including a partition provided therein and having a bore formed therein, to rotatable receive said spindle of said pump, and an air supplying device coupled to said spindle of said pump and oscillatingly driven by said spindle of said pump, to pump air into the water contained in said chamber of said container, said air supplying device including a plate attached to said pump, said plate including at least one stay extended therefrom and attached to said conduit.

2. The aquarium as claimed in claim 1, wherein said air supplying device includes a valve housing having a recess and a depression formed therein, and having a chamber formed therein and communicating with said recess and said depression thereof respectively, a first and a second check valve members disposed in said recess and said depression of said valve housing respectively, a membrane attached to said valve housing to enclose said chamber of said valve housing, and means for coupling said spindle of said pump to said membrane, to move said membrane relative to said valve housing.

3. The aquarium as claimed in claim 2, wherein said air supplying device includes a casing attached to said valve housing, to support said membrane.

4. The aquarium as claimed in claim 1, wherein said conduit includes a cap attached thereto, and includes a board having a bore formed therein, to rotatably receive said spindle of said pump.

5. The aquarium as claimed in claim 4, wherein said cap includes at least one passage formed therein, to allow the water to flow into said conduit.

6. The aquarium as claimed in claim 1, wherein said partition of said conduit includes at least one passage formed therein, to allow the water to flow from said conduit into said port of said pump.

7. An aquarium comprising:

a container including a chamber provided therein for receiving water therein, a pump disposed in said chamber of said container to circulate the water, said pump including a spindle, and an air supplying device coupled to said spindle of said pump and driven by said spindle of said pump, to pump air into the water contained in said chamber of said container, said air supplying device including a valve housing having a recess and a depression formed therein, and having a chamber formed therein and communicating with said recess and said depression thereof respectively, a first and a second check valve members disposed in said recess and said depression of said valve housing respectively, a membrane attached to said valve housing to enclose said chamber of said valve housing, and means for coupling said spindle of said pump to said membrane, to move said membrane relative to said valve housing, and said air supplying device including a plate attached to said pump, to support said valve housing, and said plate including an outlet and an inlet communicating with said recess and said depression of said valve housing respectively.

8. The aquarium as claimed in claim 7, wherein said plate includes a peripheral rib extended therefrom, and valve housing includes a peripheral groove formed therein, to receive said peripheral rib of said plate.

9. An aquarium comprising:

a container including a chamber provided therein for receiving water therein, a pump disposed in said chamber of said container to circulate the water, said pump including a spindle, and an air supplying device coupled to said spindle of said pump and driven by said spindle of said pump, to pump air into the water contained in said chamber of said container, said air supplying device including a valve housing having a recess and a depression formed therein, and having a chamber formed therein and communicating with said recess and said depression thereof respectively, a first and a second check valve members disposed in said recess and said depression of said valve housing respectively a membrane attached to said valve housing to enclose said chamber of said valve housing, and means for coupling said spindle of said pump to said membrane, to move said membrane relative to said valve housing, said air supplying device including a casing attached to said valve housing, to support said membrane, and said casing including a shank extended from said membrane, and a block attached to said spindle of said pump, and coupled to said shank, to move said shank relative to said valve housing.

10. The aquarium as claimed in claim 9, wherein said block includes an eccentric pin extended therefrom and engaged through said shank of said casing, to move said shank to actuate said membrane in a reciprocating action.

11. The aquarium as claimed in claim 9, wherein said block includes a cavity formed therein and having a non-circular cross section, said spindle of said pump includes a non-circular end to engage and to mate into said cavity of said block, and to prevent said block from rotating relative to said spindle of said pump.

12. The aquarium as claimed in claim 9, wherein said shank includes a disc secured thereto and secured to said membrane for actuating said membrane relative to said valve housing.

* * * * *